(12) United States Patent
Heuser (10) Patent No.: US 7,911,385 B2
(45) Date of Patent: Mar. 22, 2011

(54) RF TRANSMITTER GEOLOCATION SYSTEM AND RELATED METHODS

(75) Inventor: Steven Robert Heuser, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 246 days.

(21) Appl. No.: 12/394,409

(22) Filed: Feb. 27, 2009

(65) Prior Publication Data

US 2010/0220011 A1 Sep. 2, 2010

(51) Int. Cl.
*G01S 3/02* (2006.01)
(52) U.S. Cl. .................................. 342/465; 342/450
(58) Field of Classification Search .................. 342/386, 342/450, 463, 465; 455/63.1, 65
See application file for complete search history.

(56) References Cited

U.S. PATENT DOCUMENTS

| | | | | |
|---|---|---|---|---|
| 5,999,129 A | 12/1999 | Rose | ............................. | 342/394 |
| 6,018,312 A | 1/2000 | Haworth | ...................... | 342/353 |
| 6,522,296 B2 | 2/2003 | Holt | ............................. | 342/453 |
| 6,580,393 B2 | 6/2003 | Holt | ............................. | 342/453 |
| 6,608,593 B2 | 8/2003 | Holt | ............................. | 342/453 |
| 6,618,009 B2 | 9/2003 | Griffin et al. | ................. | 342/432 |
| 6,636,174 B2 | 10/2003 | Arikan et al. | ................. | 342/195 |
| 6,665,332 B1 | 12/2003 | Carlson et al. | ................. | 375/130 |
| 6,677,893 B2 | 1/2004 | Rideout et al. | ................. | 342/353 |
| 6,677,895 B1 | 1/2004 | Holt | ............................. | 342/357.1 |
| 6,795,019 B2 | 9/2004 | Holt | ............................. | 342/453 |
| 6,933,888 B1 | 8/2005 | Schiffmiller et al. | ......... | 342/387 |
| 7,218,274 B2 | 5/2007 | Arikan et al. | ................. | 342/195 |
| 7,221,701 B2 | 5/2007 | Arikan et al. | ................. | 375/148 |
| 7,304,314 B2 | 12/2007 | Zaugg | ........................ | 250/458.1 |
| 7,317,417 B2 | 1/2008 | Arikan et al. | ................... | 342/95 |
| 2008/0186235 A1 | 8/2008 | Struckman et al. | ........... | 342/465 |

OTHER PUBLICATIONS

Guldogan et al., "Comparison of the CAF-DF and Sage algorithms in multipath channel parameter estimation", Jul. 2008, pp. 33-36.
Burak et al., "A new technique for direction of arrival estimation for ionospheric multipath channels", Jul. 2007, pp. 1-32.
Guldogan et al., "A novel array signal processing technique for multipath channel parameter estimation", Jun. 2007, pp. 1-4 (English abstract).

*Primary Examiner* — Dao L Phan
(74) *Attorney, Agent, or Firm* — Allen, Dyer, Doppelt, Milbrath & Gilchrist, P.A. Attorneys at Law (57) ABSTRACT

A system for geolocating a radio frequency (RF) transmitter in the presence of multipath interference may include a plurality of RF receivers arranged in spaced relation. The system may also include a controller coupled to the plurality of receivers and configured to generate a plurality of measurements associated with the RF transmitter. The controller may also compute a plurality of ambiguity functions based upon the plurality of measurements and due to the multipath interference, and project the plurality of ambiguity functions onto a common geo-referenced grid. The controller may also detect a peak on the common geo-referenced grid indicative of a geolocation of the RF transmitter.

24 Claims, 5 Drawing Sheets

RF TRANSMITTER GEOLOCATION SYSTEM AND RELATED METHODS

FIELD OF THE INVENTION

The present invention relates to the field of geolocation of a radio frequency (RF) transmitter, and, more particularly, to geolocation of an RF transmitter in the presence of multipath interference and related methods.

BACKGROUND OF THE INVENTION

Geolocating an RF transmitter in the presence of multipath interference presents a unique and difficult problem. Signals that do not arrive at a receiver via a direct pathway have an incorrect time, frequency (Doppler), and/or angle of arrival (AOA) compared to those corresponding to the direct path. As a result of this, an erroneous geolocation may be computed using these measurements. Also, errors introduced by multipath interference, for example from buildings, are generally not zero-mean Gaussian random processes and will not necessarily average out over multiple measurements.

Current geolocation systems measure time, frequency, and/or AOA measurements and compute a potential geolocation estimate from these measurements. The potential geolocation may have increased accuracy if the errors are zero-mean Gaussian and all of the transformations are linear.

Unfortunately, the above assumptions are not generally true in the presence of multipath interference. In the presence of multipath interference, the measurement errors are typically not zero-mean or Gaussian, and the transformations from time, frequency, and AOA are typically non-linear.

U.S. Pat. No. 5,999,129 to Rose discloses a multiplatform ambiguous phase circle and time difference of arrival protection emitter location system. More particularly, Rose describes determining the geolocation of a stationary RF signal emitter from two or more moving observer aircraft. The observers receive signals from the emitter, and the system measures the phase difference between the signals. The observers perform pulse time of arrival (TOA) measurements over a predetermined clock interval, and calculate the time difference of arrival (TDOA) of corresponding, same-pulse, emitter signals. Based on geometric relationships, the system creates a series of circular lines of position (LOPs) for each observer, and computes hyperbolic LOPs based on the TDOA calculations. The system determines the emitter location from the intersection of the hyperbolic LOPs and the circular LOPs.

U.S. Pat. No. 6,933,888 to Schiffmiller et al. discloses a multi-shop coherent geolocation system. More particularly, TOA measurements at a number of collecting platforms are performed with the positions of the platforms being ascertained. The measurements are sent to a geolocation computer to arrive at the potential location of the emitter.

U.S. Pat. No. 7,317,417 to Arikan et al. is directed to a system for detection and tracking of one or more targets. A first slice of a cross-ambiguity function of a transmitted signal and the reflection thereof are calculated.

SUMMARY OF THE INVENTION

In view of the foregoing background, it is therefore an object of the present invention to provide increased accuracy in geolocating an RF transmitter in the presence of multipath interference.

This and other objects, features, and advantages in accordance with the present invention are provided by a system for geolocating an RF transmitter in the presence of multipath interference. The system may include a plurality of RF receivers arranged in spaced relation. The system may also include a controller coupled to the plurality of receivers and configured to generate a plurality of measurements associated with the RF transmitter, for example. The controller may be configured to compute a plurality of ambiguity functions based upon the plurality of measurements and due to the multipath interference, and project the plurality of ambiguity functions onto a common geo-referenced grid. The controller may also be configured to detect a peak on the common geo-referenced grid indicative of a geolocation of the RF transmitter, for example. Accordingly, the system provides increased accuracy in geolocating an RF transmitter in the presence of multipath interference.

The controller may estimate a weight of each ambiguity function relative to one another for scaling each projected ambiguity function. The controller may also further be configured to estimate the weight of each ambiguity function relative to one another as a function of noise, for example.

The controller may generate the common geo-referenced grid based upon at least one of a position, orientation, and relative movement of the plurality of RF receivers, for example.

The controller may generate the plurality of measurements as at least one of a plurality of frequency difference of arrival measurements associated with the RF transmitter, a plurality of time of arrival measurements associated with the RF transmitter, a plurality of time difference of arrival measurements associated with the RF transmitter, a plurality of frequency of arrival measurements associated with the RF transmitter, and a plurality of angle of arrival measurements associated with the RF transmitter, for example.

The controller may sum each projected ambiguity function on the common geo-referenced grid. The controller may detect a peak on the common geo-referenced grid by fitting a probability ellipse thereto.

The controller further may compute the plurality of ambiguity functions based upon calibration data. For example, the calibration data may include at least one of a time offset, a frequency offset, a polarization, and an RF receiver antenna pattern of each of the plurality of RF receivers.

The system may further include a display coupled to the controller to display at least one of the ambiguity functions, and the projected plurality of ambiguity functions, for example.

Another aspect is directed to a method for geolocating an RF transmitter in the presence of multipath interference. The method may include using a controller coupled to a plurality of RF receivers arranged in spaced relation to generate a plurality of measurements associated with the RF transmitter. The controller may also be used to compute a plurality of ambiguity functions based upon the plurality of measurements and due to the multipath interference, and project the plurality of ambiguity functions onto a common geo-referenced grid, for example. The controller may also detect a peak on the common geo-referenced grid indicative of a geolocation of the RF transmitter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to indicate similar elements in alternative embodiments.

Figure 1:
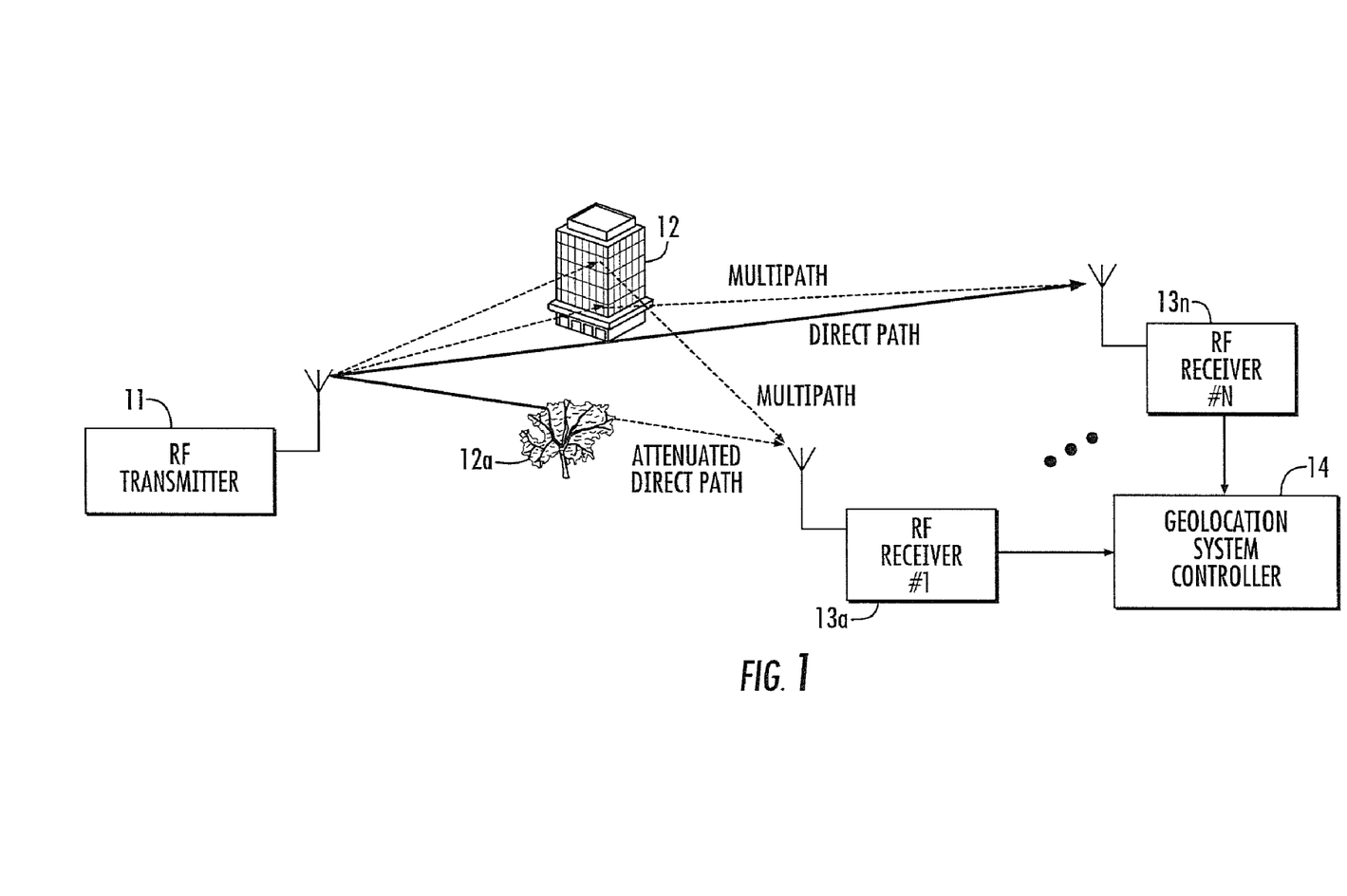
FIG. 1 is a schematic diagram of a system for geolocating an RF transmitter in the presence of multipath interference in accordance with the present invention.
Figure 2:
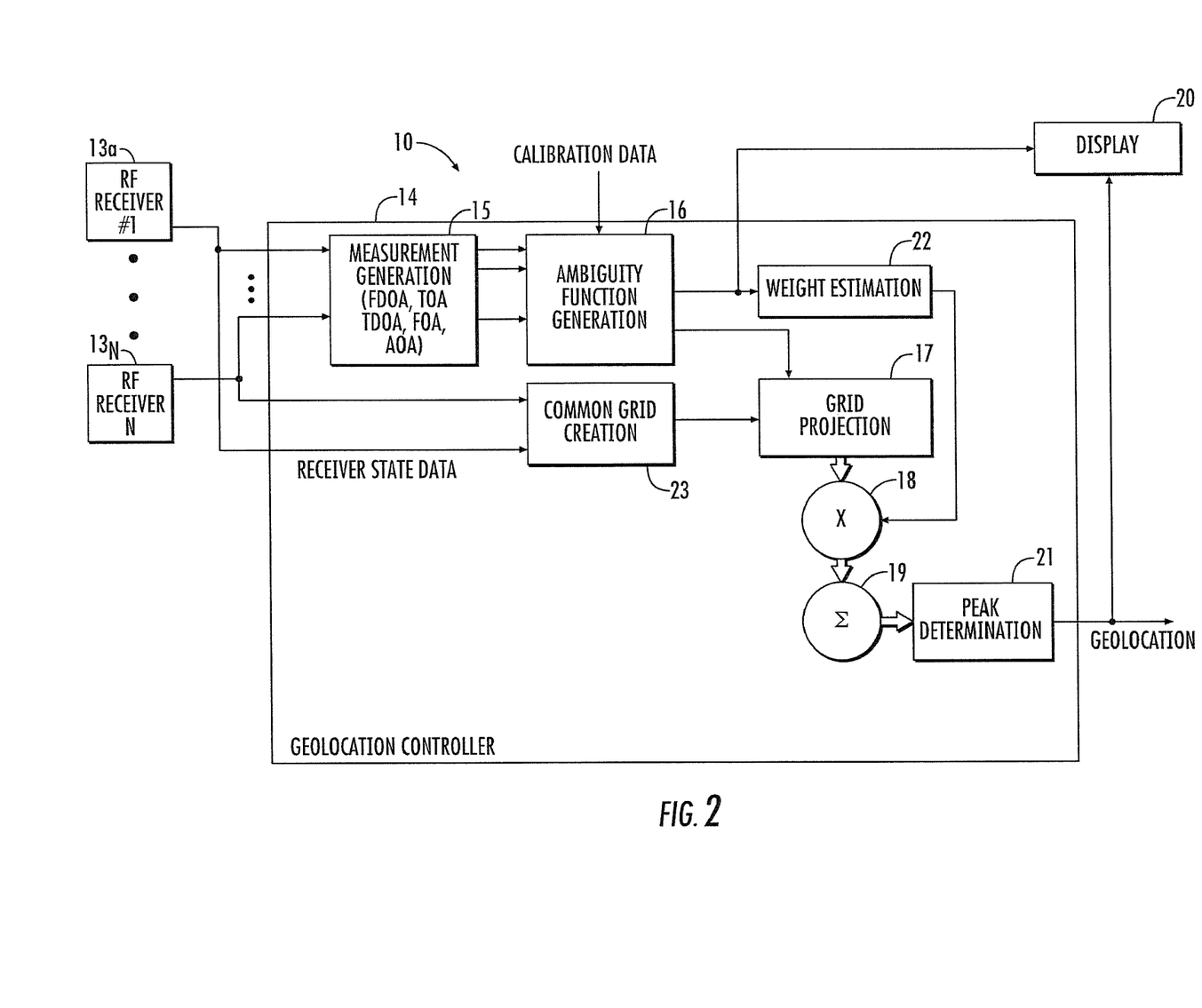
FIG. 2 is a schematic block diagram of the geolocation system of FIG. 1.

Referring initially to FIGS. 1 and 2, a system 10 for geolocating an RF transmitter 11 in the presence of multipath interference is now described. The RF transmitter 11 may be a cellular telephone, a handheld walkie-talkie, amateur radio, or other. RF transmitter, for example, as will be appreciated by those skilled in the art. The RF transmitter 11 may be stationary or moving. The RF transmitter 11 may also be non-cooperative. In other words, the RF transmitter 11 does not have to send identifying data, location data, or other sensor information, for example, to the receivers 13a-13n. However, where the RF transmitter 11 is a cellular telephone, for example, the international mobile equipment identity (IMEI) or electronic serial number (ESN) may be used to further identify the cellular phone.

As will be appreciated by those skilled in the art, multipath interference may be caused by a building 12a, for example, or any structure or natural feature, such as a tree 12b, that reflects an RF signal from the RF transmitter 11. The ionosphere is also another natural feature that may also introduce multipath interference, especially at high frequency (HF) or a lower portion of very high frequency (VHF) bands. As will be appreciated by those skilled in the art, the RF signal path resulting from multipath interference may be stronger than a direct RF signal path, for example, 6-10 dB stronger than a direct RF signal path, as the direct path is often attenuated, for example, due to shadowing or blockage.

The system 10 illustratively includes RF receivers 13a-13n arranged in spaced relation to receive the RF multipath signals. The geolocation, velocity, and orientation of each of the RF receivers 13a-13n are known, for example, from a GPS or inertial navigation unit (INU) device. This data may be sent by the RF receivers 13a-13n over a wireless link or stored for later processing. There is also typically relative movement between the RF transmitter 11 and at least one of the RF receivers to provide diversity. As will be appreciated by those skilled in the art, there may not be relative movement between the RF transmitter 11 and at least one of the RF receivers 13a-13n. The system 10 illustratively includes a controller 14 coupled to the RF receivers 13a-13n. The controller 14 illustratively includes a measurement generation Block 15 to generate a plurality of measurements associated with the RF transmitter. For example, controller 14 may be configured to generate the plurality of measurements as frequency difference of arrival (FDOA) and time difference of arrival (TDOA) measurements associated with the RF transmitter 11. As will be appreciated by those skilled in the art, and as noted above, the relative movement between the RF transmitter 11 and at least one of the RF receivers 13a-13n provides the diversity used for the FDOA measurements, and the relative position change between the RF transmitter 11 and at least one of the RF receivers 13a-13n provides the diversity used for the TDOA measurements.

In other embodiments, for example, the measurement generation Block 15 may generate time of arrival measurements (TOA) associated with the RF transmitter. Still, in further embodiments, measurement generation Block 15 may generate time difference of arrival (TDOA) measurements associated with the RF transmitter, frequency of arrival (FOA) measurements associated with the RF transmitter, or angle of arrival (AOA) measurements associated with the RF transmitter. Other measurements may be generated such as azimuth and elevation angle, for example. As will be appreciated by those skilled in the art, any of the above-noted associated measurements may be generated in combination with other associated measurements, for example, FDOA and TDOA, FOA and TOA, and AOA and azimuth angle.

Based on the particular measurements, as noted above, and due to the multipath interference, the controller 14 computes or generates ambiguity functions at the ambiguity function generation Block 16. Each ambiguity function may be computed in a native coordinate system. In other words, the ambiguity function may be computed at the ambiguity function generation Block 16 based on the measurements generated at the measurement generation Block 15.

Figure 3A:
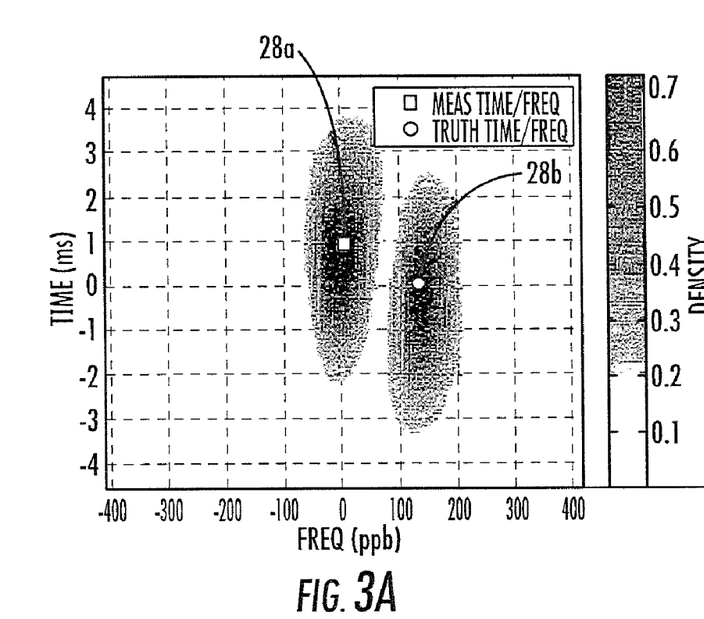
FIGS. 3a and 3b are graphs of an ambiguity function associated with the RF transmitter in accordance with the present invention.
Figure 3B:
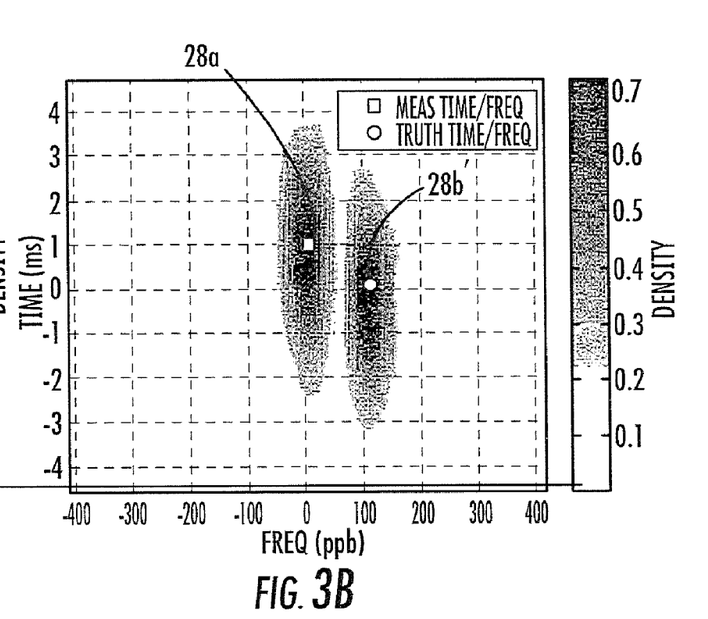

Referring briefly to FIGS. 3a and 3b, the ambiguity functions are illustratively computed based upon frequency and time for FDOA measurements and TDOA measurements. The ambiguity function displayed in FIG. 3a corresponds to a cross-ambiguity function of signals received by two RF receivers at a first time. Of course the ambiguity function may correspond to a cross-ambiguity function of more than two receivers. The first and second RF receivers measure the time and frequency of the RF signal, as FDOA and TDOA measurements, including the multipath interference. The corresponding ambiguity function is displayed. As will be appreciated by those skilled in the art, the peak 28a of the measured and displayed ambiguity function is at an incorrect location due to the multipath interference. As illustrated, a second peak 28b is displayed and is at a correct location, for example as would correspond to a direct path.

An additional displayed ambiguity function illustrated in FIG. 3b corresponds to FDOA and TDOA measurements calculated by signals received by the same first and second receivers at a second later time. Stated alternatively, the additional displayed ambiguity function illustrated in FIG. 3b is based upon measurements generated by the first and second receivers at a later time than the displayed ambiguity function illustrated in FIG. 3a. As will be appreciated by those skilled in the art, the first and second receivers have changed their geolocation or position from the first time. Similar to the ambiguity function illustrated in FIG. 3a, the overall peak 28a' of the measured and displayed ambiguity function is at an incorrect location due to the multipath interference and a second peak 28b' is displayed and is at a correct location, for example as would correspond to a direct path.

Advantageously, generating a second graphed ambiguity function at a later time generally eliminates the use of a reference RF signal, as is typically used to compute an ambiguity function based on TOA, FOA, and AOA, for example. However, relative movement between the RF transmitter 11 and the RF receiver 13a-13n supplies diversity to generate the second ambiguity function for each RF receiver 13a-13n at the ambiguity function generation Block 16 as illustrated in FIG. 3b.

If FDOA measurements are generated at the measurement generation Block 15, the ambiguity functions, or cross-ambiguity functions, for example, may be computed at the ambiguity function generation Block 16 between the RF signals received by two different RF receivers 13a-13n. Limited prior knowledge of the RF signal from the RF emitter 11 may be useful in some embodiments. Where the measurements are TDOA measurements, generation of the ambiguity functions at the ambiguity function generation Block 16 may also be between RF signals received from two different RF receivers 13a-13n, and limited or no prior knowledge of the RF signal from the RF transmitter 11 may be used.

If TOA measurements are generated at the measurement generation Block 15, each ambiguity function may be computed at the ambiguity function generation Block 16 by a correlation of the received RF signal with a known transmitted reference RF signal. For example, an RF signal may include fixed headers or sync sequences to be used as the transmitted reference RF signal, as will be appreciated by those skilled in the art.

If FOA measurements are generated at the measurement generation Block 15, each ambiguity function may be computed at the ambiguity function generation Block 16 by a correlation of the received RF signal with a known reference RF signal. For example, a demodulation and remodulation of a received RF signal from an RF receiver 13a-13n may be performed to create the reference RF signal, as will be appreciated by those skilled in the art.

If AOA measurements are generated at the measurement generation Block 15, each ambiguity function may be computed at the ambiguity function generation Block 16 by a correlation of a phase and amplitude of arrival with the RF receivers 13a-13n with a calibration table of measured or predicted RF receiver responses over frequency, angle of arrival, and/or polarization. Phase difference of arrival and amplitude difference of arrival may also be used in the correlation.

A display 20 is illustratively coupled to the controller 14 downstream from the ambiguity function generation Block 16 for displaying respective ambiguity functions, if desired. For example, a user may wish to display on the display 20, the graphs shown in FIGS. 3a and 3b.

Calibration data may be provided to the ambiguity function generation Block 16 to provide an increased accuracy ambiguity function. The calibration data may include at least one of a time offset, a frequency offset, a polarization, a time drift rate, a frequency drift rate, an amplitude offset, and an RF receiver antenna pattern of each said plurality of RF receivers over frequency, angle of arrival, and/or polarization. Other calibration data may be used, as will be appreciated by those skilled in the art.

The controller 14 further includes a common grid creation Block 23 to create a common geo-referenced grid. For example, the common geo-referenced grid created at the common grid creation Block 23 may be a hypercube having a geo-referenced coordinate system. Location data associated with the RF receivers 13a-13n is used to create the common geo-referenced grid and provide a geographic area of potential RF transmitter locations. Other RF receiver data may be used in creating the common geo-referenced grid, such as, for example, position, antenna pattern, frequency, orientation, and relative movement of the RF receivers. For example, other dimensions of the hypercube may be used to provide potential RF transmitter velocities and orientations.

The controller 14 illustratively includes a grid projection Block 17 for projecting the ambiguity functions onto the common geo-referenced grid 31.

The controller 14 also includes a weight estimation Block 22 for estimating a weight of each ambiguity function relative to one another for scaling each projected ambiguity function. More particularly, the weight of each ambiguity function may be estimated relative to one another as a function of noise, for example, a signal to noise ratio. Each weight may also be estimated as a function of a normalized ambiguity function peak, or other metrics. A higher weight may be assigned to those ambiguity functions more likely to identify the geolocation of the RF transmitter 11, for example. Other weighting metrics may be used, as will be appreciated by those skilled in the art. Respective estimated weights determined at the weight estimation Block 22 are multiplied at the multiplier Block 18 by each projected ambiguity function projected on the common geo-referenced grid 31.

Figure 4:
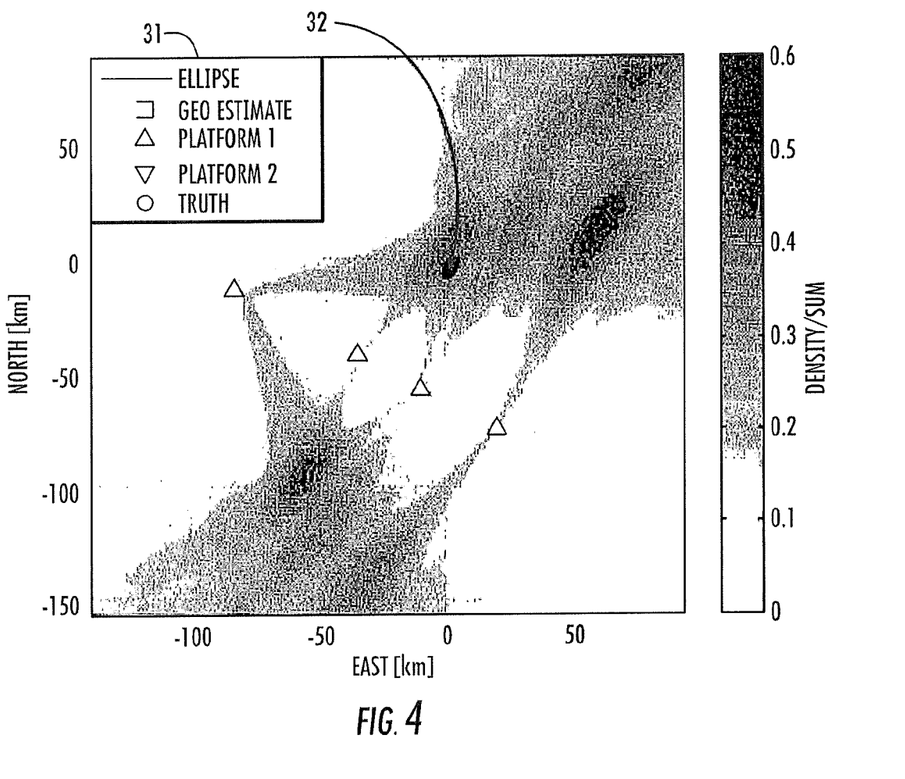
FIG. 4 is a graph of the plurality of ambiguity functions projected onto a common geo-referenced grid in accordance with the present invention.

The controller 14 further illustratively includes a summing Block 19 for summing each projected ambiguity function on the common geo-referenced grid 31. As illustrated in FIG. 4, the projected and summed ambiguity functions are on the common geo-referenced grid 31, which may be displayed by the display 20. The projected ambiguity functions appear "stacked" on the common geo-referenced grid 31, because of the summing, which contributes to an increase in density of the projected ambiguity functions. Illustratively, the peaks 28a, 28a' illustrated in FIGS. 3a and 3b due to multipath interference generally do not align with each other when projected to the common geo-referenced grid 31. Instead, the peaks 28b, 28b' having the correct location align. Accordingly, the contributions to each summed ambiguity function from multipath interference tend to "smear" or "blur" while the contributions to each summed ambiguity function from direct path tend to "stack," thus resulting in the overall peak of the summed ambiguity functions on the common geo-referenced grid 31.

The controller 14 further includes a peak determination Block 21 to detect a peak on the common geo-referenced grid 31. As noted above, the displayed individual ambiguity functions, as illustrated in FIGS. 3a and 3b, may exhibit a peak in an incorrect geolocation due to the multipath interference. Advantageously, peaks of each of the ambiguity functions, when projected and summed on the common geo-referenced grid 31, will decorrelate, and the peak of the common geo-referenced grid will likely correspond to the true RF transmitter 11 geolocation. Stated alternatively, the peak of the projected and summed ambiguity functions on the common geo-referenced grid is typically indicative of a geolocation of the RF transmitter 11.

One advantageous approach to detecting the peak of the projected and summed ambiguity functions on the common geo-referenced grid includes fitting a probability ellipse 32. The probability ellipse 32 may be fit from the location of the detected peak and a contour level surrounding the detected peak. The probability ellipse 32 may also be fit from a center of mass and an Eigen space fit of vectors from the detected peak to the surrounding surface or through a quadratic ellipsoid fit to the ambiguity surface. The ellipse 32 center corresponds to the geolocation of the RF transmitter 11 and may be output by the controller 14 such as to the display 20 or to another device, for example.

Figure 5:
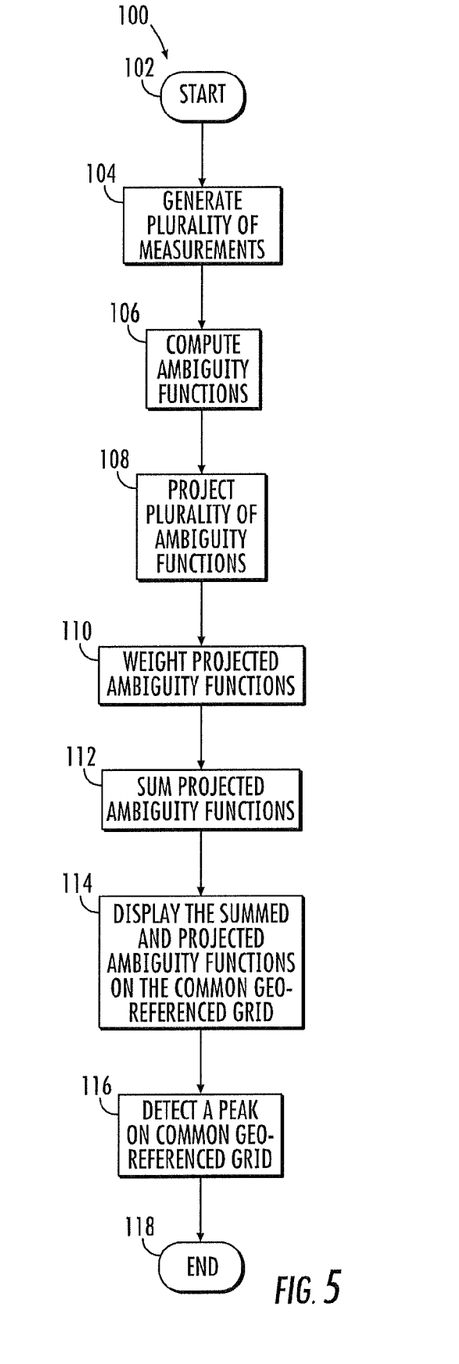
FIG. 5 is a flow chart illustrating a method for geolocating an RF transmitter in the presence of multipath interference in accordance with the invention.

Referring now to FIG. 5, with reference to the flow chart 100, another aspect is directed to a method for geolocating an RF transmitter 11 in the presence of multipath interference.

Starting at Block 102 the method includes using a controller 14 coupled to RF receivers 13a-13n arranged in spaced relation to generate a plurality of measurements associated with the RF transmitter 11 at Block 104. The method further includes using the controller 14 to compute a plurality of ambiguity functions based upon the plurality of measurements and due to the multipath interference (Block 106), and project the plurality of ambiguity functions onto a common geo-referenced grid 31 (Block 108). The controller 14 is further used at Block 110 to weight the projected ambiguity functions, and sum at Block 112 the projected ambiguity functions. The method may also include displaying at Block 114, on a display 20, the ambiguity functions and the common geo-referenced grid having the projected and summed ambiguity functions thereon. The controller 14 is still further used at Block 116 to detect a peak on the common geo-referenced grid indicative of a geolocation of the RF transmitter 11 before ending at Block 118.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for geolocating a radio frequency (RF) transmitter in the presence of multipath interference, the system comprising:
   a plurality of RF receivers arranged in spaced relation; and
   a controller coupled to said plurality of receivers configured to
      generate a plurality of measurements associated with the RF transmitter,
      compute a plurality of ambiguity functions based upon the plurality of measurements and due to the multipath interference,
      project the plurality of ambiguity functions onto a common geo-referenced grid, and
      detect a peak on the common geo-referenced grid indicative of a geolocation of the RF transmitter.

2. The system according to claim 1 wherein said controller is further configured to estimate a weight of each ambiguity function relative to one another for scaling each projected ambiguity function.

3. The system according to claim 2 wherein said controller is further configured to estimate the weight of each ambiguity function relative to one another as a function of noise.

4. The system according to claim 1 wherein said controller is further configured to generate the common geo-referenced grid based upon at least one of a position, orientation, and relative movement of said plurality of RF receivers.

5. The system according to claim 1 wherein said controller is further configured to generate the plurality of measurements as at least one of a plurality of frequency difference of arrival measurements associated with the RF transmitter, a plurality of time of arrival measurements associated with the RF transmitter, a plurality of time difference of arrival measurements associated with the RF transmitter, a plurality of frequency of arrival measurements associated with the RF transmitter, and a plurality of angle of arrival measurements associated with the RF transmitter.

6. The system according to claim 1 wherein said controller is further configured to sum each projected ambiguity function on the common geo-referenced grid.

7. The system according to claim 1 wherein said controller is further configured to detect a peak on the common geo-referenced grid by fitting a probability ellipse thereto.

8. The system according to claim 1 wherein said controller is further configured to compute the plurality of ambiguity functions based upon calibration data.

9. The system according to claim 8 wherein the calibration data comprises at least one of a time offset, a frequency offset, a polarization, and an RF receiver antenna pattern of each of said plurality of RF receivers.

10. The system according to claim 1 further comprising a display coupled to said controller to display at least one of the ambiguity functions, and the projected plurality of ambiguity functions.

11. A system for geolocating a radio frequency (RF) transmitter in the presence of multipath interference, the system comprising:
    a plurality of RF receivers arranged in spaced relation; and
    a controller coupled to said plurality of receivers configured to
       generate a plurality of measurements associated with the RF transmitter,
       compute a plurality of ambiguity functions based upon the plurality of measurements and calibration data and due to the multipath interference,
       project the plurality of ambiguity functions onto a common geo-referenced grid,
       estimate a weight of each ambiguity function relative to one another for scaling each projected ambiguity function, and
       detect a peak on the common geo-referenced grid indicative of a geolocation of the RF transmitter.

12. The system according to claim 11 wherein said controller is further configured to estimate the weight of each ambiguity function relative to one another as a function of noise.

13. The system according to claim 11 wherein said controller is further configured to generate the common geo-referenced grid based upon at least one of a position, orientation, and relative movement of said plurality of RF receivers.

14. The system according to claim 11 wherein said controller is further configured to generate the plurality of measurements as at least one of a plurality of frequency difference of arrival measurements associated with the RF transmitter, a plurality of time of arrival measurements associated with the RF transmitter, a plurality of time difference of arrival measurements associated with the RF transmitter, a plurality of frequency of arrival measurements associated with the RF transmitter, and a plurality of angle of arrival measurements associated with the RF transmitter.

15. The system according to claim 11 wherein said controller is further configured to sum each projected ambiguity function on the common geo-referenced grid.

16. The system according to claim 11 wherein said controller is further configured to detect a peak on the common geo-referenced grid by fitting a probability ellipse thereto.

17. The system according to claim 11 wherein the calibration data comprises at least one of a time offset, a frequency offset, a polarization, and an RF receiver antenna pattern of each of said plurality of RF receivers.

18. A method for geolocating a radio frequency (RF) transmitter in the presence of multipath interference comprising:
    using a controller coupled to a plurality of RF receivers arranged in spaced relation to at least
       generate a plurality of measurements associated with the RF transmitter, compute a plurality of ambiguity functions based upon the plurality of measurements and due to the multipath interference, project the plurality of ambiguity functions onto a common geo-referenced grid, and detect a peak on the common geo-referenced grid indicative of a geolocation of the RF transmitter.

19. The method according to claim 18 further comprising using the controller to estimate a weight of each ambiguity function relative to one another for scaling each projected ambiguity function.

20. The method according to claim 18 further comprising using the controller to generate the common geo-referenced grid based upon at least one of a position, orientation, and relative movement of the plurality of RF receivers.

21. The method according to claim 18 further comprising using the controller to generate the plurality of measurements further comprises using the controller to generate the plurality of measurements as at least one of a plurality of frequency difference of arrival measurements associated with the RF transmitter, a plurality time of arrival measurements associated with the RF transmitter, a plurality of time difference of arrival measurements associated with the RF transmitter, a plurality of frequency of arrival measurements associated with the RF transmitter, and a plurality of angle of arrival measurements associated with the RF transmitter.

22. The method according to claim 18 further comprising using the controller to detect the peak on the common geo-referenced grid further comprises fitting a probability ellipse thereto.

23. The method according to claim 18 further comprising using the controller to compute the plurality of ambiguity functions based upon calibration data.

24. The method according to claim 18 further comprising using the controller to display at least one of the ambiguity functions and the projected plurality of ambiguity functions by display coupled to the controller.

* * * * *

UNITED STATES PATENT AND TRADEMARK OFFICE
CERTIFICATE OF CORRECTION

PATENT NO. : 7,911,385 B2
APPLICATION NO. : 12/394409
DATED : March 22, 2011
INVENTOR(S) : Steven Robert Heuser It is certified that error appears in the above-identified patent and that said Letters Patent is hereby corrected as shown below:

In the Specifications:

Please insert the following heading and corresponding statement at the beginning of the patent.

-- Government Contract

This invention was made with Government support under Government Contract 05-C-0041 awarded by the National Reconnaissance Office. The Government has certain rights in this invention. --

Signed and Sealed this
Fourth Day of June, 2013

Teresa Stanek Rea
*Acting Director of the United States Patent and Trademark Office*